US012771510B2

(12) United States Patent
Niu et al.

(10) Patent No.: US 12,771,510 B2
(45) Date of Patent: Oct. 20, 2026

(54) INPUT SCALING FOR ARTIFICIAL INTELLIGENCE BASED CHANNEL STATE INFORMATION FEEDBACK COMPRESSION

(71) Applicant: Apple Inc., Cupertino, CA (US)

(72) Inventors: Huaning Niu, San Jose, CA (US); Dawei Zhang, Saratoga, CA (US); Weidong Yang, San Diego, CA (US); Wei Zeng, Saratoga, CA (US); Hong He, San Jose, CA (US); Ankit Bhamri, Bad Nauheim (DE)

(73) Assignee: Apple Inc., Cupertino, CA (US)

( * ) Notice: Subject to any disclaimer, the term of this patent is extended or adjusted under 35 U.S.C. 154(b) by 297 days.

(21) Appl. No.: 18/422,069

(22) Filed: Jan. 25, 2024

(65) Prior Publication Data

US 2024/0283610 A1 Aug. 22, 2024

Related U.S. Application Data

(60) Provisional application No. 63/485,585, filed on Feb. 17, 2023.

(51) Int. Cl.
*H04L 5/00* (2006.01)

(52) U.S. Cl.
CPC .................................. *H04L 5/0053* (2013.01)

(58) Field of Classification Search
CPC ............... H04L 5/0053; H04L 25/0226; H04L 25/0248; H04L 25/0254; H04L 5/0057; H04L 25/0204; G06N 3/0455; H04B 7/0626; H04B 7/0658; H04B 7/06
See application file for complete search history.

(56) References Cited

U.S. PATENT DOCUMENTS

2022/0247468 A1 * 8/2022 Huang .................. H04W 24/10

FOREIGN PATENT DOCUMENTS

WO 2024/026006 A1 2/2024

OTHER PUBLICATIONS

3GPP TSG-RAN WG1 Meeting #111; Toulouse, France, Nov. 14-181, 2022; Source: OPPO; Title: Evaluation methodology and preliminary results on AI/ML for CSI feedback enhancement Agenda Item: 9.2.2.1; Document for: Discussion and Decision (Year: 2022).*

(Continued)

*Primary Examiner* — Nizam U Ahmed
(74) *Attorney, Agent, or Firm* — Eschweiler & Potashnik, LLC; Matthew Glause

(57) ABSTRACT

Systems, methods, and circuitries are provided for aligning a number of eigen-vectors summarizing channel state information to a number of input nodes of an AI-based CSI feedback compression encoder. In one example, a method includes receiving a channel state information (CSI) report configuration that indicates a number of PRBs; determining a number of subbands and a respective number of PRBs in each respective subband; and generating a plurality of eigen-vectors, wherein one or more of the eigen-vectors summarizes a channel state matrix across a respective subband. A number eigen-vectors in the plurality corresponds to number of inputs of an artificial intelligence (AI) encoder used for CSI feedback compression.

16 Claims, 10 Drawing Sheets

(56) References Cited

OTHER PUBLICATIONS

AI for CSI Feedback Enhancement in 5G-Advanced; Jiajia Guo, Graduate Student Member, IEEE, Chao-Kai Wen, Senior Member, IEEE, Shi Jin, Senior Member, IEEE, and Xiao Li, Member, IEEE arXiv:2206.15132v2 [cs.IT] Sep. 17, 2022.
Convolutional Neural Network based Multiple-Rate Compressive Sensing for Massive MIMO CSI Feedback: Design, Simulation, and Analysis Jiajia Guo, Chao-Kai Wen, Member, IEEE, Shi Jin, Senior Member, IEEE, and Geoffrey Ye Li, Fellow, IEEE; arXiv:1906.06007v1 [eess.SP] Jun. 14, 2019.
CSI-PPPNet: A One-Sided Deep Learning Framework for Massive MIMO CSI Feedback Wei Chen, Senior Member, IEEE, Weixiao Wan, Shiyue Wang, Peng Sun, Bo Ai, Fellow, IEEE; arXiv:2211.15851v1 [eess.SP] Nov. 29, 2022.
Dealing with CSI Compression to Reduce Losses and Overhead: An Artificial Intelligence Approach; arXiv:2104.00189v1 [eess.SP] Apr. 1, 2021.
An Efficient Deep Learning Framework for Low Rate Massive MIMO CSI Reporting; DOI 10.1109; TCOMM.2020.2993626, IEEE Transactions on Communications; Jun. 29, 2020.
Overview of Deep Learning-based CSI Feedback in Massive MIMO Systems; Jiajia Guo, Graduate Student Member, IEEE, Chao-Kai Wen, Senior Member, IEEE, Shi Jin, Senior Member, IEEE, and Geoffrey Ye Li, Fellow, IEEE; arXiv:2206.14383v1 [eess.SP] Jun. 29, 2022.
Moderator (Apple); Email discussion on other aspects of AI/ML for CSI enhancement; 3GPP TSG- RAN WG1 Meeting #109-e; R1-220xxxx; May 9, 2022.
3rd Generation Partnership Project; Technical Specification Group Radio Access Network; NR; Physical channels and modulation (Release 17); 3GPP TS 38.211 V17.4.0; Dec. 2022.
3rd Generation Partnership Project; Technical Specification Group Radio Access Network; NR; Multiplexing and channel coding (Release 17); 3GPP TS 38.212 V17.4.0; Dec. 2022.
3rd Generation Partnership Project; Technical Specification Group Radio Access Network; NR; Physical layer procedures for control (Release 17); 3GPP TS 38.213 V17.4.0; Dec. 2022.
3rd Generation Partnership Project; Technical Specification Group Radio Access Network; NR; Physical layer measurements (Release 17); 3GPP TS 38.215 V17.2.0; Sep. 2022.
3rd Generation Partnership Project; Technical Specification Group Radio Access Network; NR; User Equipment (UE) radio access capabilities (Release 17); 3GPP TS 38.306 V17.3.0; Dec. 2022.
3rd Generation Partnership Project; Technical Specification Group Radio Access Network; NR; Radio Resource Control (RRC) protocol specification (Release 17); 3GPP TS 38.331 V17.3.0; Dec. 2022.
OPPO; "Evaluation methodology and preliminary results on AI/ML for CSI feedback enhancement"; 3GPP TSG-RAN WG1 Meeting #111; R1-2211478; Nov. 14, 2022.
Nokia, Nokia Shanghai Bell; "Evaluation on ML for CSI feedback enhancement"; 3GPP TSG RAN WG1 #109; R1-2204571; May 9, 2022.
Samsung; "Other aspects on AI/ML for CSI feedback enhancement"; 3GPP TSG RAN WG1 #111; R1-2212037; Nov. 14, 2022.
United Kingdom Office Action Dated Nov. 25, 2024 in connection with Application No. GB2400986.2.

* cited by examiner

INPUT SCALING FOR ARTIFICIAL INTELLIGENCE BASED CHANNEL STATE INFORMATION FEEDBACK COMPRESSION

CROSS REFERENCE TO RELATED APPLICATIONS

This application claims the benefit of priority from U.S. Provisional Patent Application Ser. No. 63/485,585 filed on Feb. 17, 2023, the contents of which are hereby incorporated in their entirety.

BACKGROUND

The present disclosure relates generally to wireless communication and more specifically to techniques for communicating channel state information (CSI) to a radio access network (RAN) node.

BRIEF DESCRIPTION OF THE DRAWINGS

Some examples of circuits, apparatuses and/or methods will be described in the following by way of example only. In this context, reference will be made to the accompanying figures.

DETAILED DESCRIPTION

Figure 1:
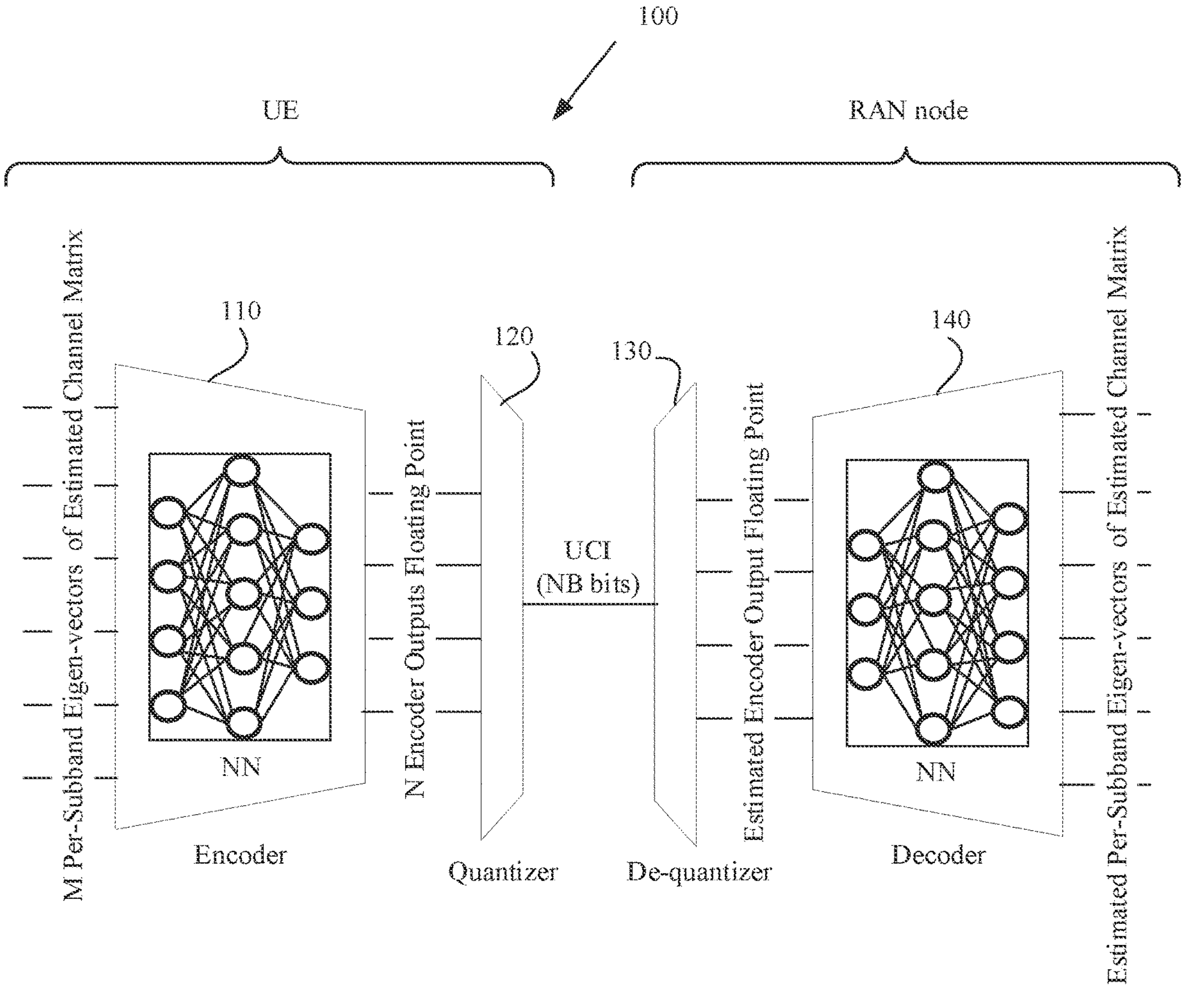
FIG. 1 is a diagram of an example of an artificial intelligence (AI)-based CSI feedback compression system, in accordance with various aspects described.

The present disclosure is described with reference to the attached figures. The figures are not drawn to scale and they are provided merely to illustrate the disclosure. Several aspects of the disclosure are described below with reference to example applications for illustration. Numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the selected present disclosure.

In massive multiple-input multiple-output (MIMO) communication systems, RAN nodes are equipped with a large number of active antennas and are simultaneously serving multiple users. Knowledge of accurate channel state information (CSI) at the RAN node is important to maximizing performance gains achievable through MIMO. Downlink CSI acquisition includes two main steps. First the user (e.g., user equipment (UE)) estimates a downlink (DL) CSI utilizing received reference signals from the RAN node. Then the user feeds the estimated DL CSI back to the RAN node through the uplink (UL) control channel (e.g., physical uplink control channel (PUCCH)). In massive MIMO systems, a large number of antennas at the RAN node result in a wide CSI dimension, resulting in substantial feedback overhead. Considerable performance loss is experienced when the RAN node transmits to a user based on outdated CSI information. Thus, a main objective of CSI feedback is reduced overhead with improved accuracy even as the number of channels increases exponentially due to massive MIMO.

To facilitate channel feedback, reference signals used for channel state measurements (e.g., CSI-RS) are transmitted on a per physical resource block (PRB) basis and the UE may separately measure signal strength in each PRB (e.g., to generate one precoder matrix indicator (PMI) per PRB). To reduce overhead, the channel state matrix encoded in the CSI feedback (also called CSI report or uplink control information (UCI) interchangeably herein) includes summarized information for groupings of adjacent PRBs called subbands. The measurements for the PRBs in each subband may be summarized by averaging the measurements for the PRBs in the subband and reporting the average value for the subband in the channel matrix, or another summarization technique may be used. The number of PRBs in each subband in the channel matrix may be configured according to 3GPP standard based on the number of PRBs in the channel or bandwidth part (BWP) being characterized. For example, if the BWP is 24 PRBs, the number of PRBs in each subband is configured based on the standard to be either 4 or 8, with a selection between the two configured values configured by higher layer signaling depending on a desired level of granularity. This means for a BWP with 24 PRBs there will either be 6 or 3 subbands having 4 or 8 PRBs, respectively, in the reported channel matrix. Many examples provided herein will be in the context of a CSI report configuration that defines a number of PRBs in a BWP for measurement and reporting purposes. The techniques described herein are equally applicable to any set of PRBs (e.g., entire channel, narrow bands, subbands of BWP, and so on) that is being measured to generate CSI feedback.

Conventional CSI methods utilize a codebook based approach in which a user and the RAN node share a codebook comprising a set of precoding matrices, or codewords, which are each mapped to a unique index. The user selects a codeword based on the estimated DL CSI and transmits the index for the codeword to the RAN node. The RAN node accesses its copy of the codebook to determine the precoding matrix mapped to the received codeword. While effective, codebook-based CSI feedback has shortcomings. Feedback accuracy is improved with larger codebooks. For example, the TYPE II codebook in 5G New Radio (NR) outperforms the smaller TYPE I codebook, but at the expense of a substantial increase in feedback bit number. In addition, the codeword search complexity significantly increases with codebook size.

Artificial intelligence (AI)-based CSI feedback compression is under consideration for improving CSI feedback in massive MIMO systems. In AI-based CSI feedback, neural networks (NNs) in the user and RAN node learn to automate compression and reconstruction of CSI without reliance on a shared codebook. FIG. 1 illustrates an AI-based CSI feedback compression system 100 in which UE side encoder circuitry 110 and RAN side decoder circuitry 140 each include a NN. The encoder 110 inputs M eigen-vectors, each of which may correspond to a respective subband of the estimated channel matrix. The encoder 110 generates, using the encoder NN, N encoder outputs. The encoder outputs may be floating point numbers. For brevity the term "encoder" herein refers to an AI-based CSI feedback compression encoder (e.g., encoder circuitry 110 and its variations described in FIGS. 3-9) and the term "decoder" herein refers to an AI-based CSI feedback compression decoder encoder (e.g., decoder circuitry 140 and its variations described in FIGS. 3-9).

Quantizer circuitry 120 uses B bits per encoder output to quantize the N encoder outputs. The resulting NB bits are communicated as uplink channel information (UCI) to the RAN node. On the RAN node side, the received UCI is de-quantized by de-quantizer circuitry 130 to generate an estimated encoder output (e.g., corresponding to the N encoder outputs). The de-quantizer circuitry 130 has knowledge (e.g., via a shared vector quantization (VQ) codebook) of the quantization method used by the quantizer circuitry 120. Decoder circuitry 140 inputs the estimated encoder output to the decoder NN to re-construct the M eigen-vectors. The RAN node uses these reconstructed, or estimated, eigen-vectors to control various transmission parameters for the UE such as, for example, precoder settings.

Neural Network Overview

Figure 2:
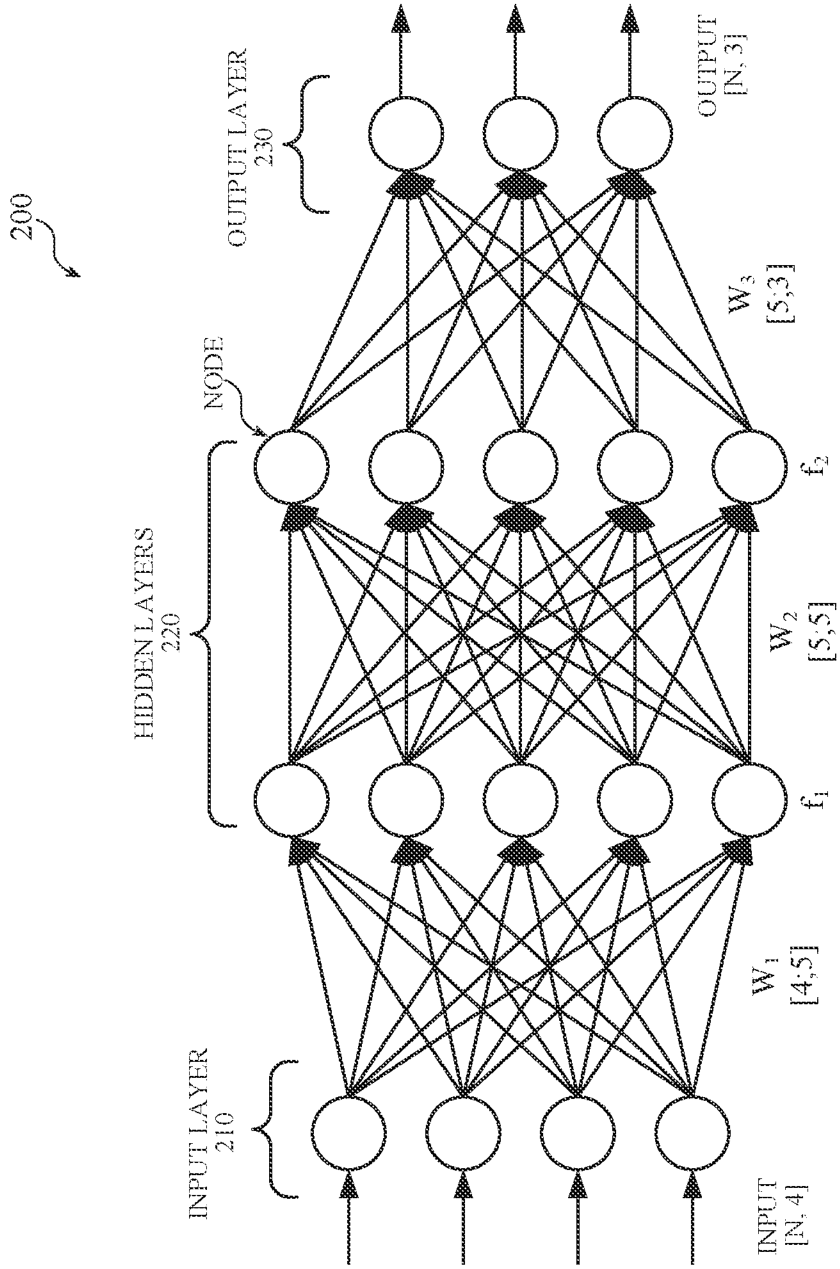
FIG. 2 is a diagram of an example neural network (NN), in accordance with various aspects described.

The encoding and decoding functions performed by the AI-based encoder and decoder is performed by a neural network. FIG. 2 is a diagram of an example of a neural network (NN) 200 according to one or more implementations described herein. As shown, NN 200 may include nodes arranged in different layers, such as an input layer 210 of nodes, multiple hidden or intermediary layers 220 of nodes, and an output layer 230 of nodes.

Example NN 200 may include a number N of inputs introduced to four input nodes [N, 4] of input layer 210. This may include processing or encoding input data into a form, shape, vector, or data structure, that is receivable by the NN. The four input nodes may process the inputs to produce a first weight (W1) that the four input nodes provide to the five nodes [4;5] of a first hidden layer. The five nodes of the first hidden layer may use a first function (f1) to process the inputs to produce a second weight (W2) that the five nodes of the first hidden layer may provide to the five nodes [5;5] of a second hidden layer. The five nodes of the second layer may use a second function (f2) to process the inputs to produce a third weight (W3) that the five nodes of the second hidden layer may provide to the three nodes [5;3] of output layer 230. The nodes of output layer 230 may each process the inputs received and produce an output. This may include converting or decoding output data from a form, shape, vector, or data structure, that may be used by a subsequent algorithm, process, or procedure.

CSI Matrix to Encoder Input Alignment

The number of input nodes for a given AI encoder for CSI feedback compression is fixed based on the training process that was used to generate the model. However, the number of PRBs in a channel being characterized by a CSI report may vary significantly from a few PRBs to a few hundred PRBs. Further, the bandwidth in which a UE is operating may change during normal operation of the UE. This may result in a misalignment between a number of subbands in a channel matrix generated by the UE and the number of input nodes of the AI encoder.

Figure 3:
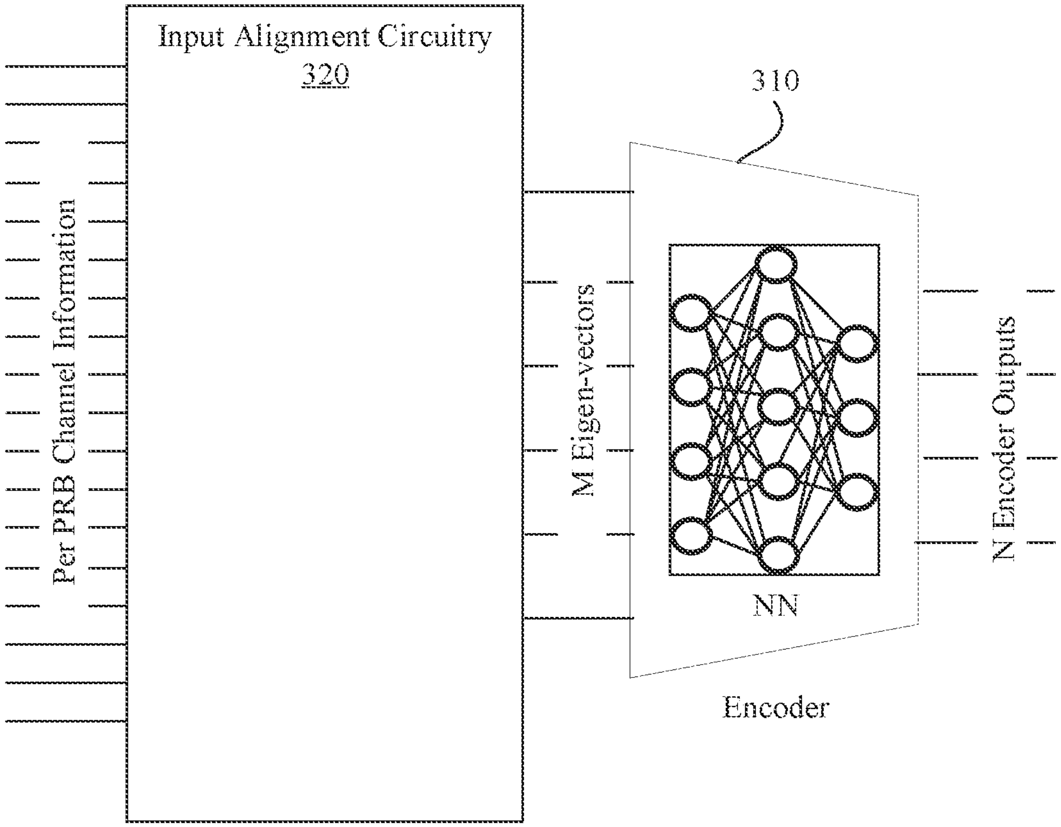
FIG. 3 is a diagram of an example AI-based CSI feedback compression encoding system that includes input alignment circuitry, in accordance with various aspects described.
Figure 6:
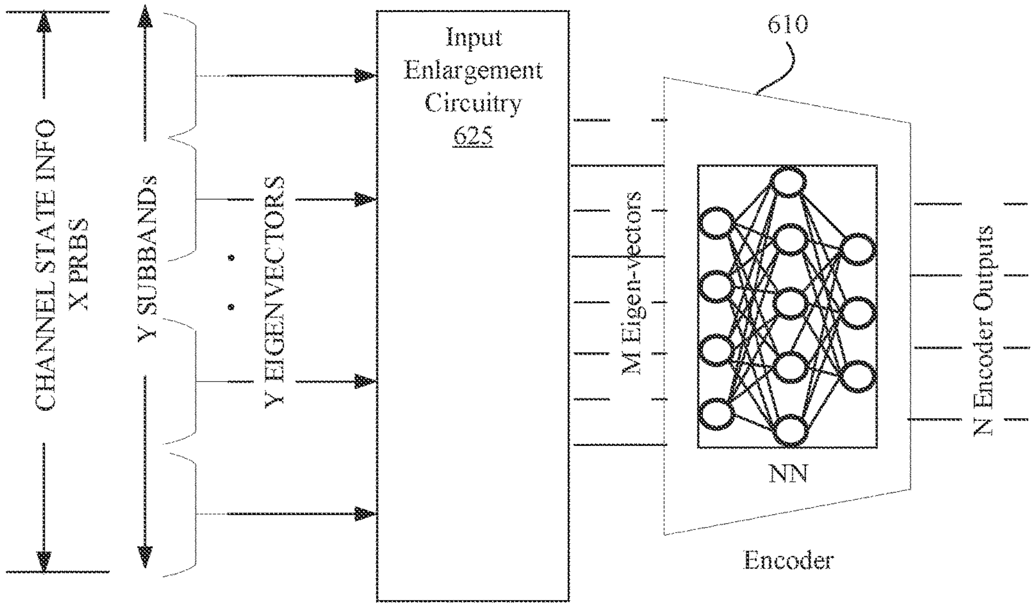
FIGS. 6, 6A, 6B illustrate example techniques for expanding a set of calculated eigen-vectors to an input size of an AI-based CSI feedback compression encoder, in accordance with various aspects described.

FIG. 3 illustrates a CSI feedback compression system that may be implemented in a UE for generating encoder outputs which may be transmitted to a base station for use with a corresponding (e.g., tandemly trained) decoder (not shown, see FIG. 1). The system includes input alignment circuitry 320 that generates an appropriate number of eigen-vectors for a given encoder input size (M in the illustrated examples) for varying numbers of BWP sizes. The input alignment circuitry 320 receives channel state information on a per-PRB basis for the BWP and generates, based on one or more techniques disclosed herein, M eigen-vectors, at least some of which summarize the channel matrix across a respective subband. Input enlargement circuitry 625 of the input alignment circuitry 320 is illustrated in FIG. 6.

Figure 4:
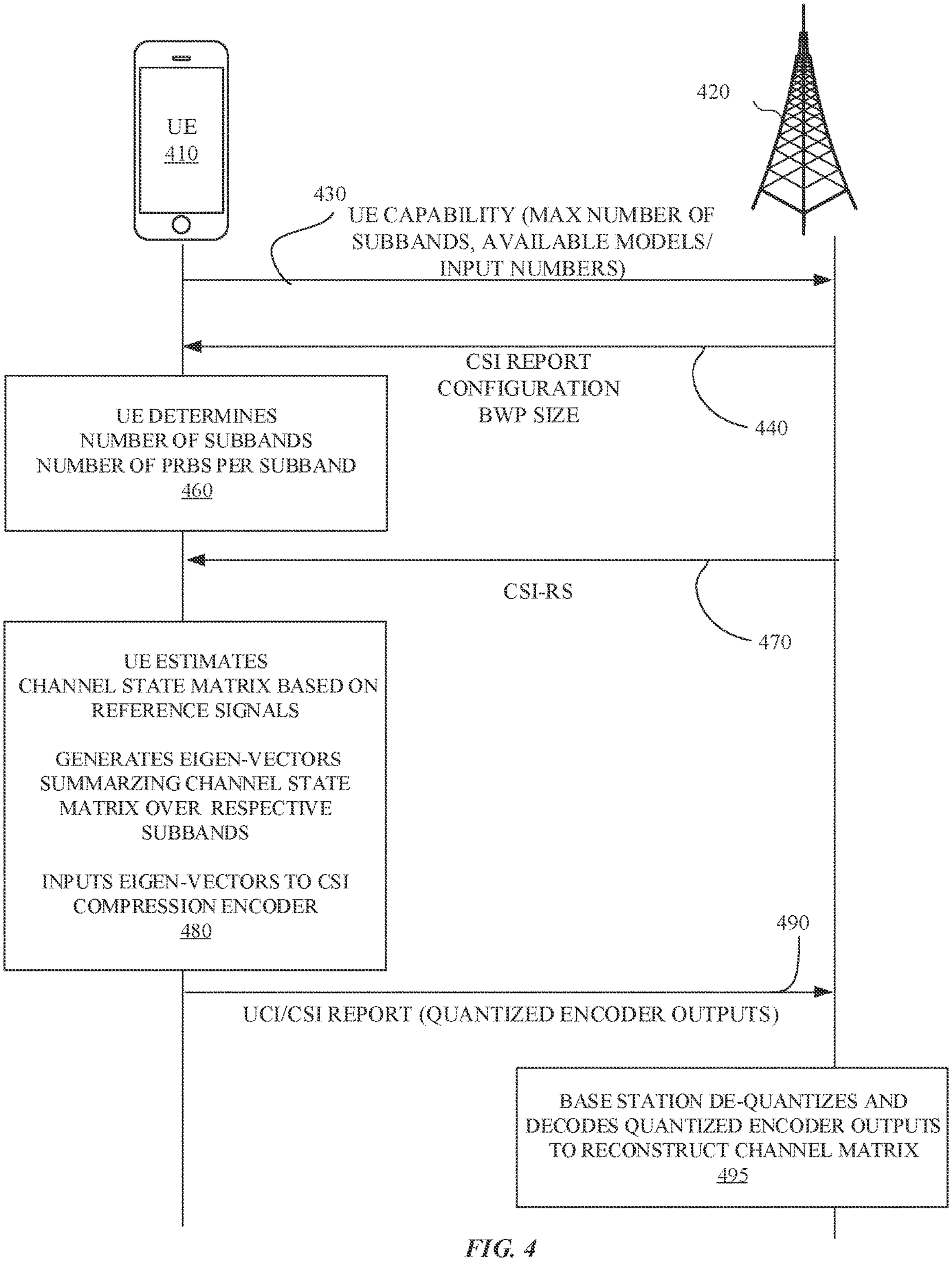
FIG. 4 illustrates an example message sequence for performing AI-based CSI feedback compression, in accordance with various aspects described.

FIG. 4 is a message flow diagram outlining a general technique for aligning the subbands of the channel state matrix with a number of input nodes of an encoder. A UE 410 transmits a capability message 430 that indicates whether the UE is capable of AI-based CSI feedback compression and may provide additional information regarding a maximum number of subbands/model inputs the UE supports. A base station 420 transmits a CSI report configuration message 440 that identifies a particular AI encoder to be used for CSI feedback compression, a number of bits to be used in UCI, and includes a BWP size defining a number of PRBs to be measured for CSI feedback purposes. At 460, the UE determines a number of subbands and a number of PRBs per subband for use in the channel matrix.

The base station transmits reference signals (e.g., CSI-RS) 470. At 480, the determines the channel state matrix based on the reference signals. Based on one or more the techniques disclosed with reference to FIGS. 5-9, the UE generates a set of eigen-vectors in which one or more of the eigen-vectors summarizes the channel state matrix across a respective subband. The number eigen-vectors in the set corresponds to number of inputs of the encoder. The UE inputs the eigen-vectors to the encoder and generates compressed CSI feedback (i.e., encoder outputs). The UE transmits UCI 490 that encodes quantized encoder outputs. At 495, the base station de-quantizes and decodes the received quantized encoder outputs to reconstruct the channel matrix.

Variable Number of Subbands for Input Size Alignment

Figure 5:
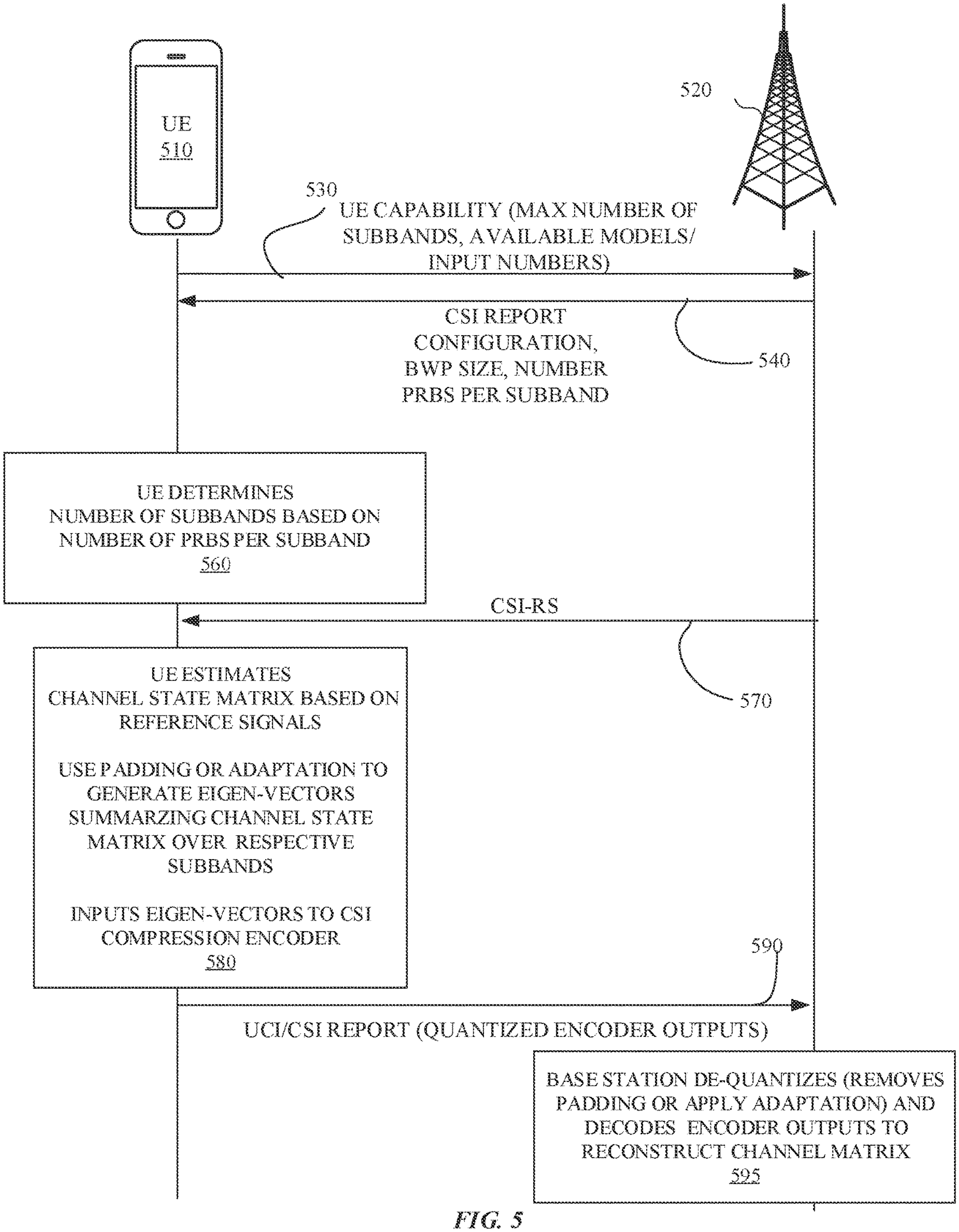
FIG. 5 illustrates an example message sequence for performing AI-based CSI feedback compression, in accordance with various aspects described.

FIG. 5 is a message flow diagram outlining an example of a first technique for aligning subbands of the channel state matrix with a number of input nodes of an encoder. In the first technique, a number of PRBs per subband is the same amongst all the subbands and the number of subbands has a limited variability. In this technique, the number of subbands and subband size may not be optimized based on the number of input nodes of the AI-based encoder.

A UE 510 transmits a capability message 530 that indicates whether the UE is capable of AI-based CSI feedback compression and may provide additional information regarding a maximum number of subbands/model inputs the UE supports. A base station 520 transmits a CSI report configuration message 540 that may indicate a CSI feedback compression model ID that has an appropriate input size for the UE (based on the UE's capabilities) and includes a BWP size defining a number of PRBs to be measured for CSI feedback purposes. The CSI report configuration message 540 may indicate which of multiple preconfigured (e.g., based on 3GPP specification) numbers of PRBs per subband are to be used for the channel matrix as described above. The CSI report configuration message 540 may explicitly indicate a configuration of a number of PRBs per subband and/or a number of subbands. In one example, the number of PRBs per subband and/or number of subbands is fixed as a function of BWP size based on 3GPP specification or prior configuration of the UE and this information is not included in the CSI report configuration message 540.

At 560, the UE determines a number of subbands and a number of PRBs per subband for use in the channel matrix based on the configured number of subbands and PRBs per subband indicated by message 540 or based on a preconfigured fixed number of subbands and/or number of PRBs per subband.

The base station transmits reference signals (e.g., CSI-RS) 570. At 580, the UE determines the channel state matrix based on the reference signals and, if the number of subbands is less than the number of inputs to the encoder, the UE uses padding or adaptation to generate the set of eigen-vectors for input to the AI-based encoder. The UE inputs the eigen-vectors to the AI-based encoder and generates compressed CSI feedback encoder output. The UE transmits UCI 590 that encodes quantized encoder outputs. At 595, the base station de-quantizes and decodes the received quantized encoder outputs to reconstruct the channel matrix.

Figure 6A:
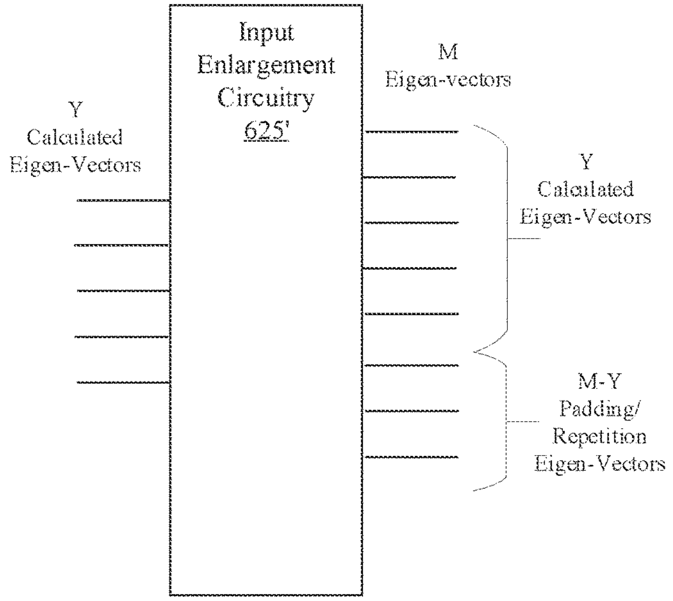
Figure 6B:
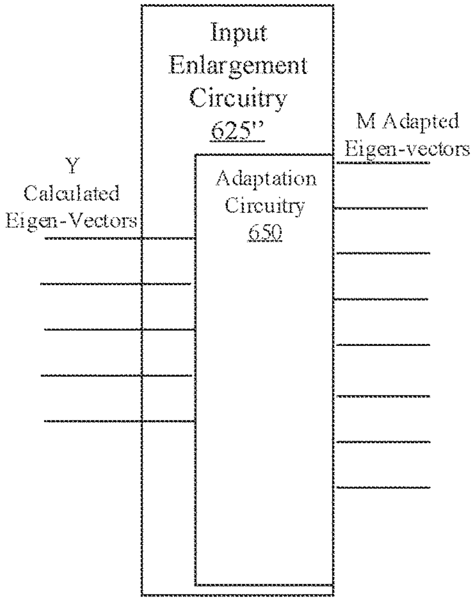

FIGS. 6, 6A, and 6B illustrate operation of exemplary input enlargement circuitry 625 of the UE 510 that may participate in the generation of the eigen-vectors that are input to an AI-based encoder 610. The number of PRBs in the BWP (X) and the number of subbands in the channel matrix (Y) is set by the UE based on signaling from the base station or preconfiguration as disclosed with reference to FIG. 5. The UE divides the channel state information for X PRBs into Y subbands and calculates Y eigen-vectors representing the channel state matrix based on the channel state information. Since the number of subbands was not determined based on the number of input nodes for the encoder 610, the number of eigen-vectors may not be equal to the number of input nodes. The input enlargement circuitry 625 may employ one of two techniques to expand the set of eigen-vectors to match the input size of the encoder 610.

As illustrated in FIG. 6A, input enlargement circuitry 625' may generate a sufficient number of padding eigen-vectors to make a total of M eigen-vectors. The padding eigen-vectors may comprise all zeros or all ones or correspond to any other a priori known padding eigen-vector such as a repetition eigen-vector. The base station is configured to recognize and remove any padding eigen-vectors during the reconstruction process. Thus, as shown in FIG. 6A, the input enlargement circuitry 625' may input the Y calculated eigen-vectors for the preconfigured subbands and generate M-Y padding/repetition eigen-vectors to provide a complete set of M eigen-vectors for use by the encoder 610.

As illustrated in FIG. 6B, input enlargement circuitry 625" may use adaptation circuitry 650 that implements an adaption layer or function that transforms Y eigen-vectors into M eigen-vectors. The adaptation function may include distributing or dividing the values in one calculated eigen-vector into multiple eigen-vectors. The base station is configured to apply a reverse adaptation function to the decoder output during the reconstruction process. Thus, as shown in FIG. 6A, the input enlargement circuitry 625" may input the Y calculated eigen-vectors for the preconfigured subbands to an adaptation function to generate a complete set of M eigen-vectors for use by the encoder 610.

In narrow BWPs, where a number of PRBs is less than the number of input nodes for the AI-based encoder, the techniques illustrated in FIGS. 6, 6A, and 6B may be used assuming a configured subband size of 1 PRB.

Returning to FIG. 5, the UE capability report 530 may indicate whether the UE is capable of using the padding technique of FIG. 6A and/or the adaptation technique of FIG. 6B to enlarge the set of eigen-vectors. The CSI report configuration 540 may indicate whether padding or adaptation is to be used in generating the compressed CSI feedback reported by the UE in UCI 590.

Variable Subband Size for Input Size Alignment

Figure 7:
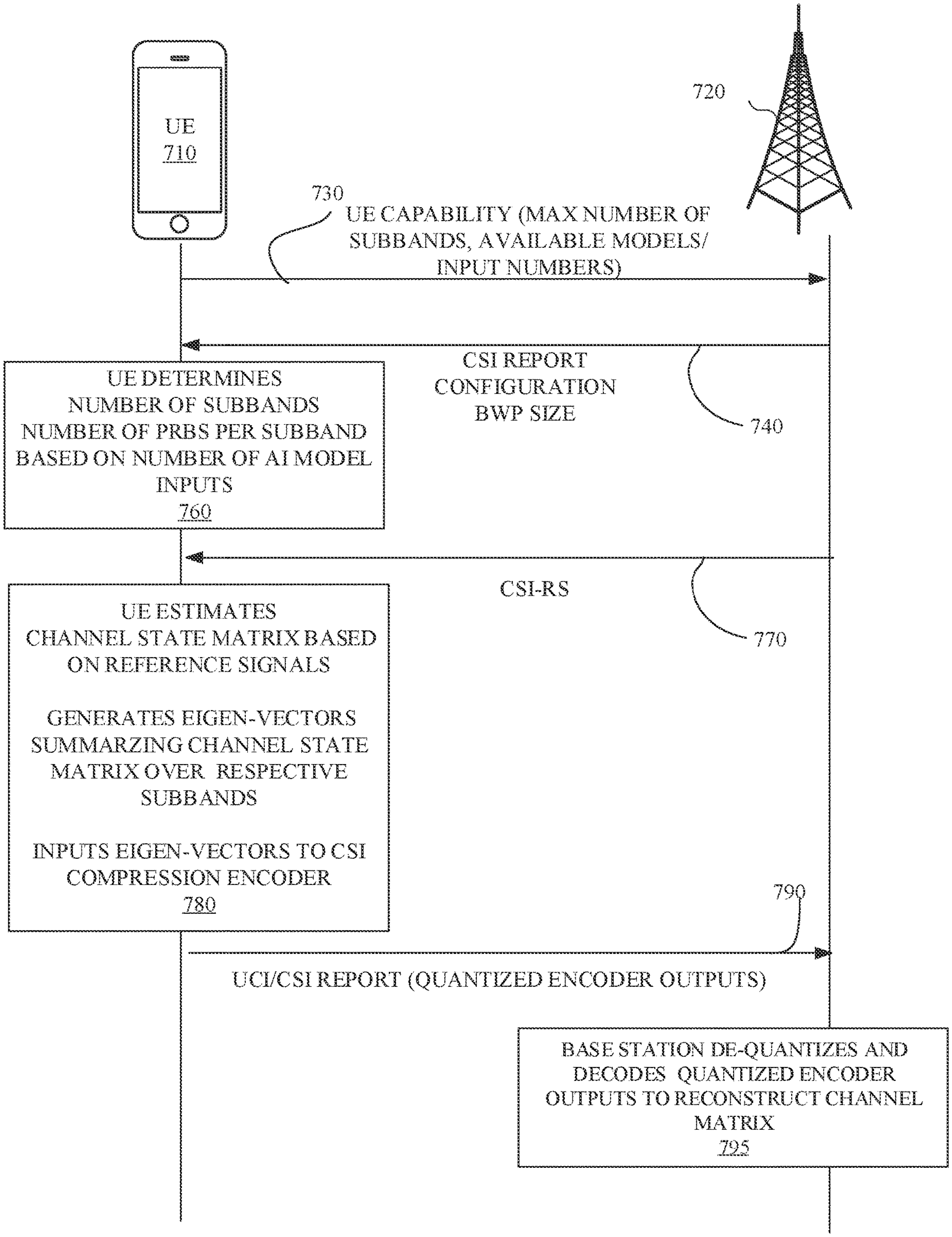
FIG. 7 illustrates an example message sequence for performing AI-based CSI feedback compression, in accordance with various aspects described.

FIG. 7 is a message flow diagram outlining an example of a second technique for aligning the subbands of the channel state matrix with a number of input nodes of an AI-based CSI feedback compression model. In this second technique, a number of PRBs per subband does not have to be the same as between all subbands and a number of subbands is not limited to preconfigured options as in the first technique disclosed with reference to FIGS. 5 and 6. Rather, in the second technique the number of subbands is determined based on the number of input nodes of the AI-based encoder and the PRBs in the BWP are distributed amongst the determined number of subbands. A UE 710 transmits a capability message 730 that indicates whether the UE is capable of AI-based CSI feedback compression and may provide additional information regarding a maximum number of subbands/model inputs the UE supports and whether the UE supports a variable subband size.

A base station 720 transmits a CSI report configuration message 740 that identifies a particular AI encoder to be used for CSI feedback compression and includes a BWP size defining a number of PRBs to be measured for CSI feedback purposes. The CSI configuration 740 may indicate a CSI feedback compression model ID that has an appropriate input size for the UE (based on the UE's capabilities), a UCI size, and/or a subband size or sizes.

At 760, the UE determines a number of subbands and a number of PRBs per subband for use in the channel matrix based on (e.g., equal to or an integer multiple of) the number of input nodes of the AI-based encoder. In one example, the UE determines the number of subbands to be equal to the number of input nodes of the AI-based encoder. The UE distributes PRBs as equally as possible between the subbands, with the flexibility that the number of PRBs in the respective subbands may vary by one PRB.

For example, when the quotient of the number of PRBs in the BWP and the number of subbands is a whole number, the UE determines a number of PRBs for all respective subbands as the quotient. When the quotient is not a whole number, the UE determines a first subband size for a first set of respective subbands as a next higher whole number with respect to the quotient and a second subband size for a second set of respective subbands as one less PRB than the first subband size. For a particular example, if the AI-based model has nine input nodes and the BWP has 24 PRBs, the UE determines the first number of PRBs per subband as 3, which is the next higher whole number with respect to the quotient of 24 (PRBs in BWP) and 9 (number of subbands). The UE assigns 3 PRBs to a first set of 9-k subbands and then assigns 2 PRBs to the remaining k subbands. In the example, the UE would set the size of 6 subbands to 3 PRBs and the size of 3 subbands to 2 PRBs. The subbands including PRBs associated with a lower frequency may have the larger subband size, or vice versa, or any other preconfigured arrangement of subbands of different sizes may be implemented.

In one example, the first and second subband sizes are configured with the BWP in message 740.

The base station transmits reference signals (e.g., CSI-RS) 770. At 780, the UE determines the channel state matrix based on the subbands and subband sizes determined at 760. The UE inputs the eigen-vectors to the AI-based encoder and generates compressed CSI feedback encoder output. The UE transmits UCI 790 that encodes quantized encoder outputs. At 795, the base station de-quantizes and decodes the received quantized encoder outputs to reconstruct the channel matrix.

In another example, the UE divides the PRBs into a number of subbands that is equal to an integer multiple of the number of input nodes of the AI-based encoder (M). This allows for some flexibility in trading granularity for signaling overhead with wider BWPs. The UE distributes the PRBs within the subbands to determine the subband size for each subband as described above. The UE provides each set of M subbands, in succession, to the AI-based encoder to generate a succession of sets of encoder outputs. The sets of encoder outputs may be separately transmitted in different parts of the CSI report or in separate CSI reports.

Channel Quality Indicator Report Subband Size

In addition to compressed CSI feedback, the UE generates and transmits a channel quality index (CQI) report that assigns a scalar quality indicator to each subband in the BWP. The CQI report may be generated based on the subband sizes determined according to the techniques above for use in generating input eigen-vectors for the AI-based encoder. Alternatively, the CQI report may be generated based on a legacy configuration of subband sizes.

Figure 8:
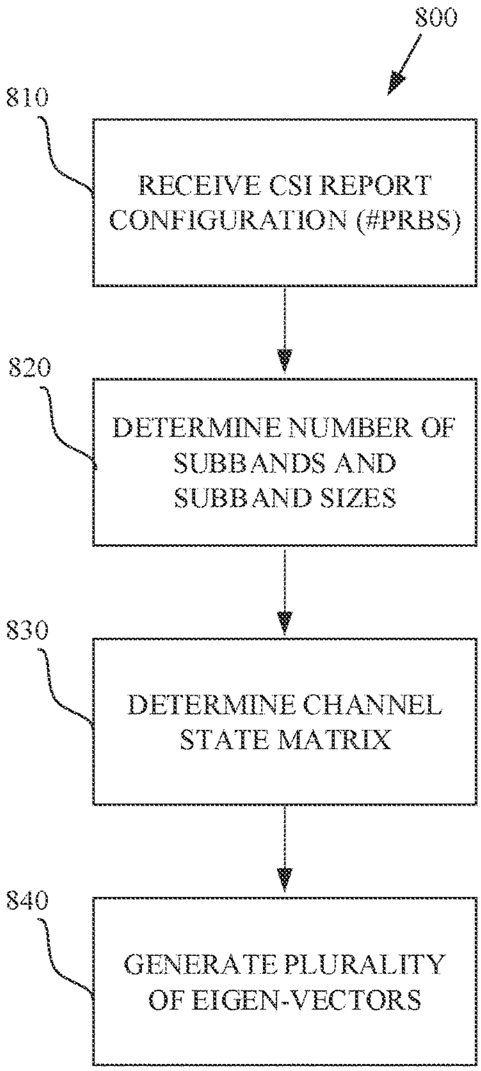
FIG. 8 is a flow diagram outlining an example method for performing AI-based CSI feedback compression, in accordance with various aspects described.

FIG. 8 is a flow diagram outlining an example method 800 for aligning a number of eigen-vectors summarizing channel state information to a number of input nodes of an AI-based CSI feedback compression encoder. The method 800 may be performed by UE 410, 510, or 710 of FIGS. 4, 5, and 7, respectively. Instructions for performing the method 800 may be stored in memory of a UE for execution by a baseband processor of the UE. The method includes, at 810, receiving a channel state information (CSI) report configuration for a channel that includes a number of PRBs. At 820 a number of subbands and a respective number of PRBs in each respective subband is determined based on one of the techniques described with respect to FIGS. 3-7. At 830, the method includes determining a channel state matrix for the channel based on received reference signals. The method includes, at 840, generating a plurality of eigen-vectors, wherein one or more of the eigen-vectors summarizes the channel state matrix across a respective subband, further wherein a number eigen-vectors in the plurality corresponds to number of inputs of an artificial intelligence (AI) encoder used for CSI feedback compression.

In one example, the method includes inputting the plurality of eigen-vectors to the AI encoder used for CSI feedback compression; and encoding a CSI report based on an output of the AI encoder used for CSI feedback compression.

In one example, as disclosed with reference to FIGS. 5 and 6, the method includes receiving a configuration of the number of PRBs in each subband; determining the number of subbands based on the configured number of PRBs and the number of PRBs in the channel; and generating an eigen-vector for each sub-band. A number of PRBs in each respective subband may be the same. In on example, when the number of subbands is less than the number of inputs of the AI encoder used for CSI feedback compression, as illustrated in FIG. 6A, the method includes generating padding eigen-vectors for input to the AI encoder used for CSI feedback compression. In another example, when the number of subbands is less than the number of inputs of the AI encoder used for CSI feedback compression, as illustrated in FIG. 6B, the method includes generating the plurality of eigen-vectors by adapting the eigen-vectors generated for the subbands. The method may include receiving a configuration indicating either padding eigen-vectors or adaptation of subband eigen-vectors for use in generating the plurality of eigen-vectors when the number of subbands is less than the number of inputs of the AI encoder used for CSI feedback compression. In one example, the method includes transmitting a UE capability report indicating a maximum number of eigen-vectors, whether multiple model input sizes are supported, or whether the UE supports generation of padding eigen-vectors or adaptation of subband eigen-vectors for use in generating the plurality of eigen-vectors when the number of subbands is less than the number of inputs of the AI encoder used for CSI feedback compression.

In on example, as disclosed with reference to FIG. 7, the method includes determining the number of subbands to be equal to an integer multiple the number of inputs to the AI encoder used for CSI feedback compression, wherein the integer is greater than or equal to one; determining a number of PRBs for each of the subbands such that all PRBs in the channel are assigned to a subband and no subband includes a PRB outside the channel; generating the integer multiple of pluralities of eigen-vectors; and successively inputting the respective pluralities of eigen-vectors to the AI encoder used for CSI feedback compression. In one example, the method includes, when the quotient of the number of PRBs in the channel and the number of subbands is a whole number, determining a number of PRBs for all respective subbands as the quotient. When the quotient is not a whole number, the method includes determining a first number of PRBs for a first set of respective subbands as a next higher whole number with respect to the quotient and a second number of PRBs for a second set of respective subbands as one less PRB than the first number of PRBs.

In one example, the method includes receiving a configuration of the number of PRBs for each subband and/or a configuration of the integer. The method may include transmitting a UE capability report indicating support of a variable subband size, a maximum number of eigen-vectors, or whether multiple model input sizes are supported.

In one example, when the number of PRBs in the channel is X PRBs less than the number of inputs to the AI encoder used for CSI feedback compression, the method includes assigning each PRB in the channel to a different subband; and generating X padding eigen-vectors or repetition eigen-vectors.

Figure 9:
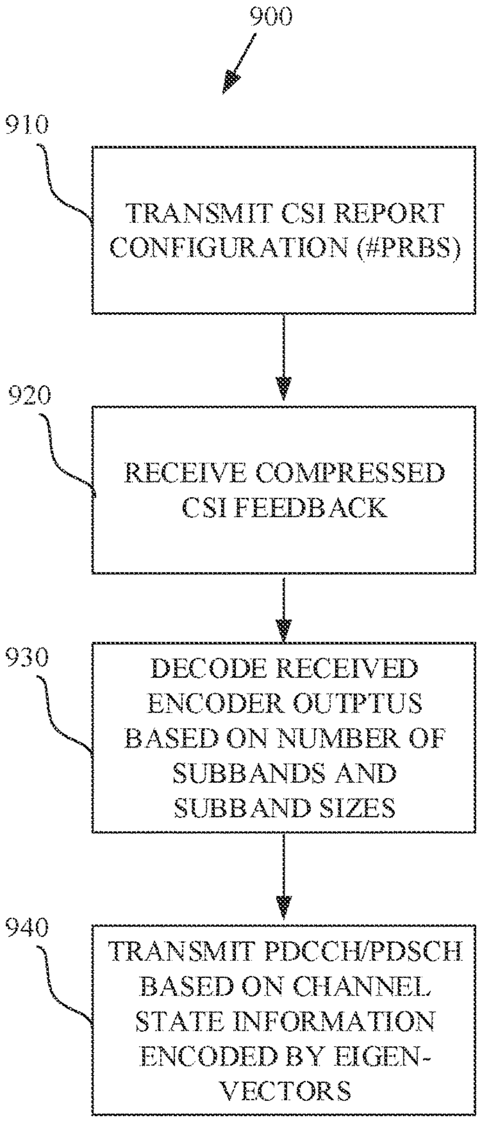
FIG. 9 is a flow diagram outlining an example method for performing AI-based CSI feedback compression, in accordance with various aspects described.

FIG. 9 is a flow diagram outlining an example method 900 for processing received compressed CSI feedback. The method 900 may be performed by base station 420, 520, or 720 of FIGS. 4, 5, and 7, respectively. Instructions for performing the method 900 may be stored in memory of a base station for execution by a processor of the base station. The method includes, at 910, transmitting a channel state information (CSI) report configuration for a channel that includes a number of PRBs. At 920 compressed CSI feedback corresponding to a set of AI-based CSI feedback compression encoder outputs is received from a UE. At 930 the received encoder outputs are decoded to generate a set of M estimated input eigen-vectors summarizing a channel state matrix, wherein M is a number of inputs to the AI-based CSI feedback compression encoder. The decoding is based on a number of subbands and a respective number of PRBs in each respective subband. The method includes, at 940, transmitting physical downlink control channel or physical downlink shared channel (PDCCH/PDSCH) based on channel state information encoded by a set of eigen-vectors that includes at least one of the M estimated input eigen-vectors.

In one example, as disclosed with reference to FIGS. 5 and 6, the method includes transmitting a configuration of the number of PRBs in each subband and determining the number of subbands based on the configured number of PRBs and the number of PRBs in the channel. A number of PRBs in each respective subband may be the same. In on example, when the number of subbands is less than the number of inputs of the AI encoder used for CSI feedback compression, as illustrated in FIG. 6A, the method includes removing padding eigen-vectors from the M estimated input eigen-vectors to generate the set of eigen-vectors. In another example, when the number of subbands is less than the number of inputs of the AI encoder used for CSI feedback compression, as illustrated in FIG. 6B, the method includes adapting the M estimated input eigen-vectors to generate a reduced number of eigen-vectors for the set of eigen-vectors. The method may include transmitting a configuration indicating either padding eigen-vectors or adaptation of subband eigen-vectors for use in generating the plurality of eigen-vectors when the number of subbands is less than the number of inputs of the AI encoder used for CSI feedback compression. In one example, the method includes receiving a UE capability report indicating a maximum number of eigen-vectors, whether multiple model input sizes are supported, or whether the UE supports generation of padding eigen-vectors or adaptation of subband eigen-vectors for use in generating the plurality of eigen-vectors when the number of subbands is less than the number of inputs of the AI encoder used for CSI feedback compression.

In one example, the method includes transmitting a configuration indicating fixed or variable subband size. In one example, as disclosed with reference to FIG. 7, the method includes determining the number of subbands to be equal to an integer multiple the number of inputs to the AI encoder used for CSI feedback compression. In one example, the method includes transmitting a configuration of the number of PRBs for each subband and/or a configuration of the integer. The method may include receiving a UE capability report indicating support of a variable subband size, a maximum number of eigen-vectors, or whether multiple model input sizes are supported. In one example, the method includes receiving successive compressed CSI feedback associated with different respective portions of a same channel, decoding each successive compressed CSI feedback to generate successive sets of eigen-vectors, and including the successive sets of eigen-vectors in the set Above are several descriptions of flow diagrams outlining example methods and exchanges of messages. In this description and the appended claims, use of the term "determine" with reference to some entity (e.g., parameter, variable, and so on) in describing a method step or function is to be construed broadly. For example, "determine" is to be construed to encompass, for example, receiving and parsing a communication that encodes the entity or a value of an entity. "Determine" should be construed to encompass accessing and reading memory (e.g., lookup table, register, device memory, remote memory, and so on) that stores the entity or value for the entity. "Determine" should be construed to encompass computing or deriving the entity or value of the entity based on other quantities or entities. "Determine" should be construed to encompass any manner of deducing or identifying an entity or value of the entity.

As used herein, the term identify when used with reference to some entity or value of an entity is to be construed broadly as encompassing any manner of determining the entity or value of the entity. For example, the term identify is to be construed to encompass, for example, receiving and parsing a communication that encodes the entity or a value of the entity. The term identify should be construed to encompass accessing and reading memory (e.g., device queue, lookup table, register, device memory, remote memory, and so on) that stores the entity or value for the entity.

As used herein, the term encode when used with reference to some entity or value of an entity is to be construed broadly as encompassing any manner or technique for generating a data sequence or signal that communicates the entity to another component.

As used herein, the term select when used with reference to some entity or value of an entity is to be construed broadly as encompassing any manner of determining the entity or value of the entity from amongst a plurality or range of possible choices. For example, the term select is to be construed to encompass accessing and reading memory (e.g., lookup table, register, device memory, remote memory, and so on) that stores the entities or values for the entity and returning one entity or entity value from amongst those stored. The term select is to be construed as applying one or more constraints or rules to an input set of parameters to determine an appropriate entity or entity value. The term select is to be construed as broadly encompassing any manner of choosing an entity based on one or more parameters or conditions.

As used herein, the term derive when used with reference to some entity or value of an entity is to be construed broadly. "Derive" should be construed to encompass accessing and reading memory (e.g., lookup table, register, device memory, remote memory, and so on) that stores some initial value or foundational values and performing processing and/or logical/mathematical operations on the value or values to generate the derived entity or value for the entity. The term derive should be construed to encompass computing or calculating the entity or value of the entity based on other quantities or entities. The term derive should be construed to encompass any manner of deducing or identifying an entity or value of the entity.

As used herein, the term indicate when used with reference to some entity (e.g., parameter or setting) or value of an entity is to be construed broadly as encompassing any manner of communicating the entity or value of the entity either explicitly or implicitly. For example, bits within a transmitted message may be used to explicitly encode an indicated value or may encode an index or other indicator that is mapped to the indicated value by prior configuration. The absence of a field within a message may implicitly indicate a value of an entity based on prior configuration.

Figure 10:
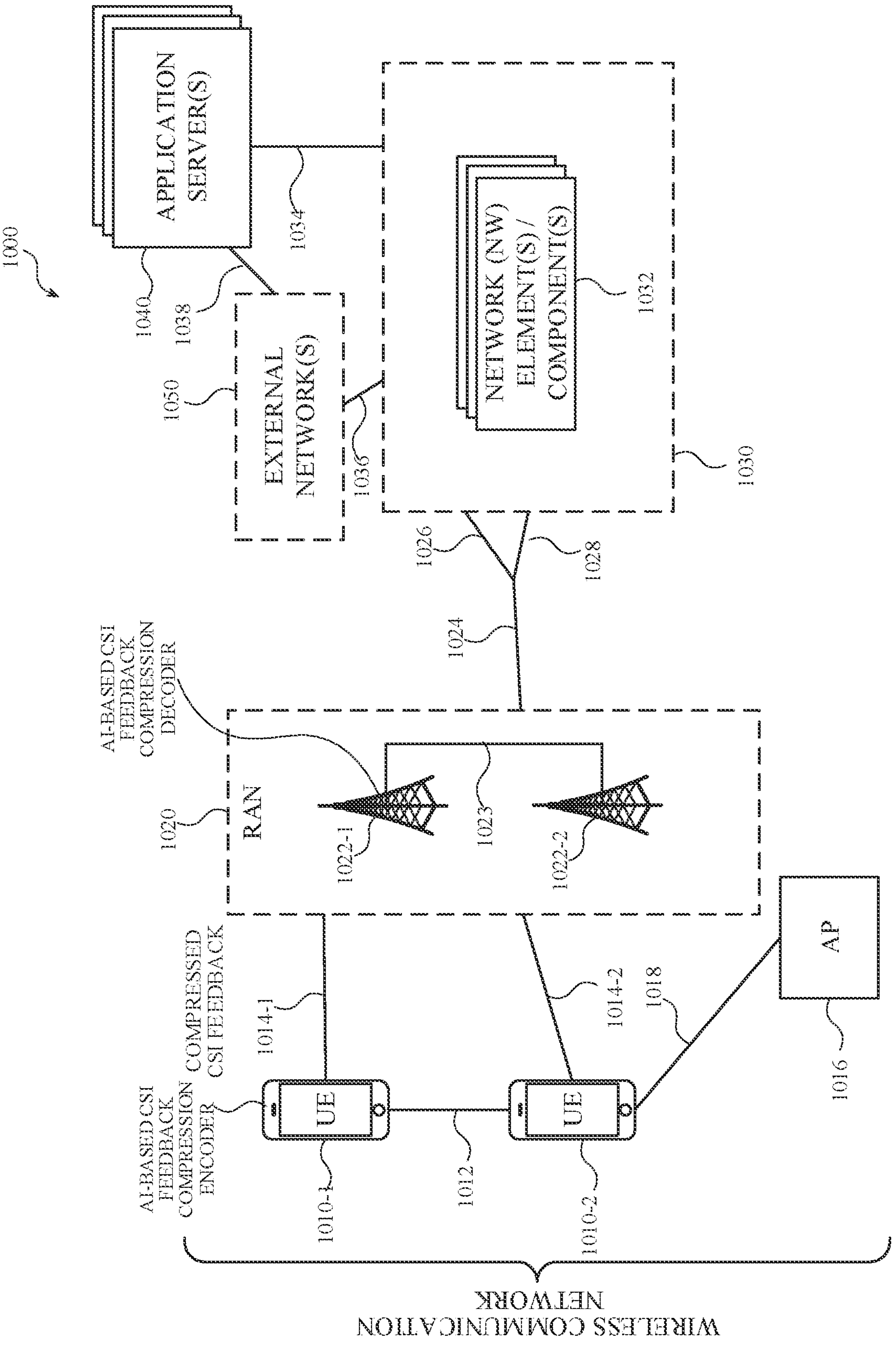
FIG. 10 is a functional block diagram of a wireless communication network, in accordance with various aspects described.

FIG. 10 is an example network 1000 according to one or more implementations described herein. Example network 1000 may include UEs 1010-1, 1010-2, etc. (referred to collectively as "UEs 1010" and individually as "UE 1010"), a radio access network (RAN) 1020, a core network (CN) 1030, application servers 1040, and external networks 1050.

The systems and devices of example network 1000 may operate in accordance with one or more communication standards, such as 2nd generation (2G), 3rd generation (3G), 4th generation (4G) (e.g., long-term evolution (LTE)), and/or 5th generation (5G) (e.g., new radio (NR)) communication standards of the 3rd generation partnership project (3GPP). Additionally, or alternatively, one or more of the systems and devices of example network 1000 may operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 1010 may include smartphones (e.g., handheld touchscreen mobile computing devices connectable to one or more wireless communication networks). Additionally, or alternatively, UEs 1010 may include other types of mobile or non-mobile computing devices capable of wireless communications, such as personal data assistants (PDAs), pagers, laptop computers, desktop computers, wireless handsets, watches etc. In some implementations, UEs 1010 may include internet of things (IoT) devices (or IoT UEs) that may comprise a network access layer designed for low-power IoT applications utilizing short-lived UE connections. Additionally, or alternatively, an IoT UE may utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Depending on the scenario, an M2M or MTC exchange of data may be a machine-initiated exchange, and an IoT network may include interconnecting IoT UEs (which may include uniquely identifiable embedded computing devices within an Internet infrastructure) with short-lived connections. In some scenarios, IoT UEs may execute background applications (e.g., keep-alive messages, status updates, etc.) to facilitate the connections of the IoT network.

UEs 1010 may use one or more wireless channels 1012 to communicate with one another. As described herein, UE 1010-1 may communicate with RAN node 1022 to request SL resources. RAN node 1022 may respond to the request by providing UE 1010 with a dynamic grant (DG) or configured grant (CG) regarding SL resources. A DG may involve a grant based on a grant request from UE 1010. A CG may involve a resource grant without a grant request and may be based on a type of service being provided (e.g., services that have strict timing or latency requirements). UE 1010 may perform a clear channel assessment (CCA) procedure based on the DG or CG, select SL resources based on the CCA procedure and the DG or CG; and communicate with another UE 1010 based on the SL resources. The UE 1010 may communicate with RAN node 1022 using a licensed frequency band and communicate with the other UE 1010 using an unlicensed frequency band.

UEs 1010 may communicate and establish a connection with (e.g., be communicatively coupled) with RAN 1020, which may involve one or more wireless channels 1014-1 and 1014-2, each of which may comprise a physical communications interface/layer.

As shown, UE 1010 may also, or alternatively, connect to access point (AP) 1016 via connection interface 1018, which may include an air interface enabling UE 1010 to communicatively couple with AP 1016. AP 1016 may comprise a wireless local area network (WLAN), WLAN node, WLAN termination point, etc. The connection 1018 may comprise a local wireless connection, such as a connection consistent with any IEEE 702.11 protocol, and AP 1016 may comprise a wireless fidelity (Wi-Fi®) router or other AP. While not explicitly depicted in FIG. 10, AP 1016 may be connected to another network (e.g., the Internet) without connecting to RAN 1020 or CN 1030.

RAN 1020 may include one or more RAN nodes 1022-1 and 1022-2 (referred to collectively as RAN nodes 1022, and individually as RAN node 1022) that enable channels 1014-1 and 1014-2 to be established between UEs 1010 and RAN 1020. RAN nodes 1022 may include network access points configured to provide radio baseband functions for data and/or voice connectivity between users and the network based on one or more of the communication technologies described herein (e.g., 2G, 3G, 4G, 5G, WiFi, etc.). As examples therefore, a RAN node may be an E-UTRAN Node B (e.g., an enhanced Node B, eNodeB, eNB, 4G base station, etc.), a next generation base station (e.g., a 5G base station, NR base station, next generation eNBs (gNB), etc.). RAN nodes 1022 may include a roadside unit (RSU), a transmission reception point (TRxP or TRP), and one or more other types of ground stations (e.g., terrestrial access points). In some scenarios, RAN node 1022 may be a dedicated physical device, such as a macrocell base station, and/or a low power (LP) base station for providing femtocells, picocells or the like having smaller coverage areas, smaller user capacity, or higher bandwidth compared to macrocells.

The physical downlink shared channel (PDSCH) may carry user data and higher layer signaling to UEs 210. The physical downlink control channel (PDCCH) may carry information about the transport format and resource allocations related to the PDSCH channel, among other things. The PDCCH may also inform UEs 1010 about the transport format, resource allocation, and hybrid automatic repeat request (HARQ) information related to the uplink shared channel. Typically, downlink scheduling (e.g., assigning control and shared channel resource blocks to UE 1010-2 within a cell) may be performed at any of the RAN nodes 1022 based on channel quality information fed back from any of UEs 1010. The downlink resource assignment information may be sent on the PDCCH used for (e.g., assigned to) each of UEs 1010.

As described with reference to FIGS. 1-9, any of the UEs 1010 may implement an AI-based CSI feedback encoder that cooperates with a paired AI-based CSI compression feedback decoder implemented by a RAN node 1022 to transmit the channel quality information in a compressed manner (e.g., compressed CSI feedback).

In some implementations, a downlink resource grid may be used for downlink transmissions from any of the RAN nodes 1022 to UEs 1010, and uplink transmissions may utilize similar techniques. The grid may be a time-frequency grid (e.g., a resource grid or time-frequency resource grid) that represents the physical resource for downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises resource blocks, which describe the mapping of certain physical channels to resource elements. Each resource block may comprise a collection of resource elements (REs); in the frequency domain, this may represent the smallest quantity of resources that currently may be allocated. There are several different physical downlink channels that are conveyed using such resource blocks.

Further, RAN nodes 1022 may be configured to wirelessly communicate with UEs 1010, and/or one another, over a licensed medium (also referred to as the "licensed spectrum" and/or the "licensed band"), an unlicensed shared medium (also referred to as the "unlicensed spectrum" and/or the "unlicensed band"), or combination thereof. In an example, a licensed spectrum may include channels that operate in the frequency range of approximately 400 MHz to approximately 3.8 GHZ, whereas the unlicensed spectrum may include the 5 GHz band. A licensed spectrum may correspond to channels or frequency bands selected, reserved, regulated, etc., for certain types of wireless activity (e.g., wireless telecommunication network activity), whereas an unlicensed spectrum may correspond to one or more frequency bands that are not restricted for certain types of wireless activity. Whether a particular frequency band corresponds to a licensed medium or an unlicensed medium may depend on one or more factors, such as frequency allocations determined by a public-sector organization (e.g., a government agency, regulatory body, etc.) or frequency allocations determined by a private-sector organization involved in developing wireless communication standards and protocols, etc.

The RAN nodes 1022 may be configured to communicate with one another via interface 1023. In implementations where the system is an LTE system, interface 1023 may be an X2 interface. In NR systems, interface 1023 may be an Xn interface. The X2 interface may be defined between two or more RAN nodes 1022 (e.g., two or more eNBs/gNBs or a combination thereof) that connect to evolved packet core (EPC) or CN 1030, or between two eNBs connecting to an EPC.

Figure 11:
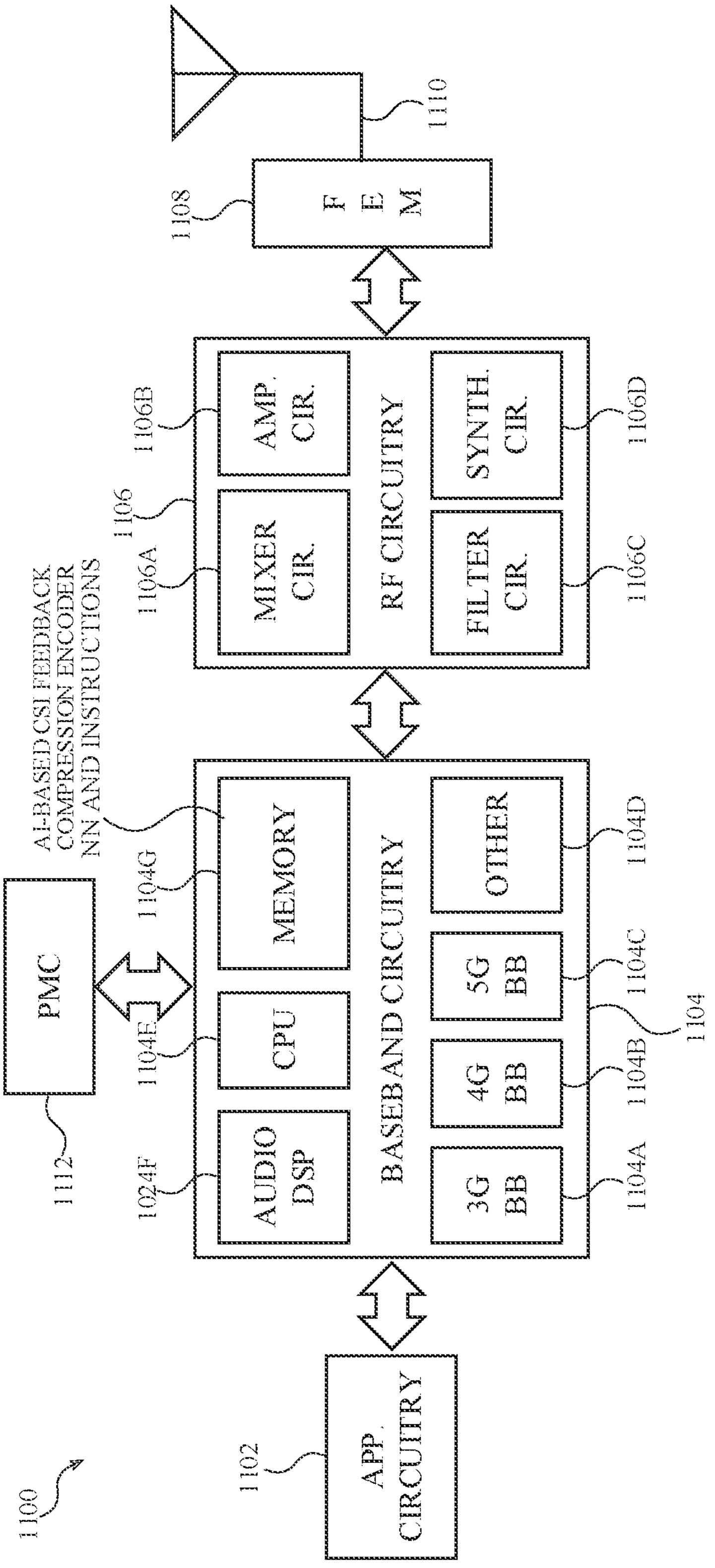
FIG. 11 illustrates a simplified block diagram of a network device, in accordance with various aspects described.

As shown, RAN 1020 may be connected (e.g., communicatively coupled) to CN 1030. CN 1030 may comprise a plurality of network elements 1032, which are configured to offer various data and telecommunications services to customers/subscribers (e.g., users of UEs 1010) who are connected to the CN 1030 via the RAN 1020. In some implementations, CN 1030 may include an evolved packet core (EPC), a 5G CN, and/or one or more additional or alternative types of CNs. The components of the CN 1030 may be implemented in one physical node or separate physical nodes including components to read and execute instructions from a machine-readable or computer-readable medium (e.g., a non-transitory machine-readable storage medium FIG. 11 is a diagram of an example of components of a network device according to one or more implementations described herein. In some implementations, the device 1100 can include application circuitry 1102, baseband circuitry 1104, RF circuitry 1106, front-end module (FEM) circuitry 1108, one or more antennas 1110, and power management circuitry (PMC) 1112 coupled together at least as shown. The components of the illustrated device 1100 can be included in a UE or a RAN node. In some implementations, the device 1100 can include fewer elements (e.g., a RAN node may not utilize application circuitry 1102, and instead include a processor/controller to process IP data received from a CN or an Evolved Packet Core (EPC)). In some implementations, the device 1100 can include additional elements such as, for example, memory/storage, display, camera, sensor (including one or more temperature sensors, such as a single temperature sensor, a plurality of temperature sensors at different locations in device 1100, etc.), or input/output (I/O) interface. In other implementations, the components described below can be included in more than one device (e.g., said circuitries can be separately included in more than one device for Cloud-RAN (C-RAN) implementations).

The application circuitry 1102 can include one or more application processors. For example, the application circuitry 1102 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 1100. In some implementations, processors of application circuitry 1102 can process IP data packets received from an EPC.

The baseband circuitry 1104 can include circuitry such as, but not limited to, one or more single-core or multi-core processors. The baseband circuitry 1104 can include one or more baseband processors or control logic to process baseband signals received from a receive signal path of the RF circuitry 1106 and to generate baseband signals for a transmit signal path of the RF circuitry 1106. Baseband circuitry 1104 can interface with the application circuitry 1102 for generation and processing of the baseband signals and for controlling operations of the RF circuitry 1106. For example, in some implementations, the baseband circuitry 1104 can include a 3G baseband processor 1104A, a 4G baseband processor 1104B, a 5G baseband processor 1104C, or other baseband processor(s) 1104D for other existing generations, generations in development or to be developed in the future (e.g., 5G, 6G, etc.).

The baseband circuitry 1104 (e.g., one or more of baseband processors 1104A-D) can handle various radio control functions that enable communication with one or more radio networks via the RF circuitry 1106. In other implementations, some or all of the functionality of baseband processors 1104A-D can be included in modules stored in the memory 1104G and executed via a Central Processing Unit (CPU) 1104E. In some implementations, the baseband circuitry 1104 can include one or more audio digital signal processor (s) (DSP) 1104F.

In some implementations, memory 1104G may receive and/or store instructions for implementing and a neural network associated with, an AI-based CSI feedback encoder that cooperates with a paired AI-based CSI compression feedback decoder implemented by a RAN node to generate compressed CSI feedback as described with reference to FIGS. 1-9.

RF circuitry 1106 can enable communication with wireless networks using modulated electromagnetic radiation through a non-solid medium. In various implementations, the RF circuitry 1106 can include switches, filters, amplifiers, etc. to facilitate the communication with the wireless network. RF circuitry 1106 can include a receive signal path which can include circuitry to down-convert RF signals received from the FEM circuitry 1108 and provide baseband signals to the baseband circuitry 1104. RF circuitry 1106 can also include a transmit signal path which can include circuitry to up-convert baseband signals provided by the baseband circuitry 1104 and provide RF output signals to the FEM circuitry 1108 for transmission.

In some implementations, the receive signal path of the RF circuitry 1106 can include mixer circuitry 1106A, amplifier circuitry 1106B and filter circuitry 1106C. In some implementations, the transmit signal path of the RF circuitry 1106 can include filter circuitry 1106C and mixer circuitry 1106A. RF circuitry 1106 can also include synthesizer circuitry 1106D for synthesizing a frequency for use by the mixer circuitry 1106A of the receive signal path and the transmit signal path.

Examples herein can include subject matter such as a method, means for performing acts or blocks of the method, at least one machine-readable medium including executable instructions that, when performed by a machine or circuitry (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to implementations and examples described.

Example 1 is an apparatus for a user equipment (UE), including a memory and a baseband processor coupled to the memory. The baseband processor is configured to, when executing instructions stored in the memory, cause the UE to receive a channel state information (CSI) report configuration that indicates a number of PRBs; determine a number of subbands and a respective number of PRBs in each respective subband; and generate a plurality of eigen-vectors, wherein one or more of the eigen-vectors summarizes a channel state matrix across a respective subband, further wherein a number eigen-vectors in the plurality corresponds to number of inputs of an artificial intelligence (AI) encoder used for CSI feedback compression.

Example 2 includes the subject matter of example 1, including or omitting optional elements, wherein the baseband processor is configured to input the plurality of eigen-vectors to the AI encoder used for CSI feedback compression; and encode a CSI report based on an output of the AI encoder used for CSI feedback compression.

Example 3 includes the subject matter of any of examples 1-2, including or omitting optional elements, wherein the baseband processor is configured to receive a configuration of the number of PRBs in each subband; determine the number of subbands based on the configured number of PRBs in each subband and the number of PRBs indicated by the CSI report configuration; and generate an eigen-vector for each sub-band.

Example 4 includes the subject matter of any of examples 1-3, including or omitting optional elements, wherein a number of PRBs in each respective subband is the same.

Example 5 includes the subject matter of any of examples 1-4, including or omitting optional elements, wherein the baseband processor is configured to, when the number of subbands is less than the number of inputs of the AI encoder used for CSI feedback compression, generate padding eigen-vectors for input to the AI encoder used for CSI feedback compression.

Example 6 includes the subject matter of any of examples 1-5, including or omitting optional elements, wherein the baseband processor is configured to, when the number of subbands is less than the number of inputs of the AI encoder used for CSI feedback compression, generate the plurality of eigen-vectors by adapting the eigen-vectors generated for the subbands.

Example 7 includes the subject matter of any of examples 1-6, including or omitting optional elements, wherein the baseband processor is configured to receive a configuration indicating either padding eigen-vectors or adaptation of subband eigen-vectors for use in generating the plurality of eigen-vectors when the number of subbands is less than the number of inputs of the AI encoder used for CSI feedback compression.

Example 8 includes the subject matter of any of examples 1-7, including or omitting optional elements, wherein the baseband processor is configured to cause transmission of a UE capability report indicating a maximum number of eigen-vectors, whether multiple model input sizes are supported, or whether the UE supports generation of padding eigen-vectors or adaptation of subband eigen-vectors for use in generating the plurality of eigen-vectors when the number of subbands is less than the number of inputs of the AI encoder used for CSI feedback compression.

Example 9 includes the subject matter of any of examples 1-8, including or omitting optional elements, wherein the baseband processor is configured to determine the number of subbands to be equal to an integer multiple of the number of inputs to the AI encoder used for CSI feedback compression, wherein the integer is greater than or equal to one; determine a number of PRBs for each of the subbands such that all PRBs indicated by the CSI report configuration are assigned to a subband and no subband includes a PRB outside the PRBs indicated by the CSI report configuration; generate the integer number of respective sets eigen-vectors, wherein each set includes a number of eigen-vectors equal to the number of inputs to the AI encoder used for CSI feedback compression; and successively input the respective sets of eigen-vectors to the AI encoder used for CSI feedback compression.

Example 10 includes the subject matter of any of examples 1-9, including or omitting optional elements, wherein the baseband processor is configured to when the quotient of the number of PRBs indicated by the CSI report configuration and the number of subbands is a whole number, determine a number of PRBs for all respective subbands as the quotient; and when the quotient is not a whole number, determine a first number of PRBs for a first set of respective subbands as a next higher whole number with respect to the quotient and a second number of PRBs for a second set of respective subbands as one less PRB than the first number of PRBs.

Example 11 includes the subject matter of any of examples 1-10, including or omitting optional elements, wherein the baseband processor is configured to receive a configuration of the number of PRBs for each subband.

Example 12 includes the subject matter of any of examples 1-11, including or omitting optional elements, wherein the baseband processor is configured to receive a configuration of the integer.

Example 13 includes the subject matter of any of examples 1-12, including or omitting optional elements, wherein the baseband processor is configured to cause transmission of a UE capability report indicating support of a variable subband size, a maximum number of eigen-vectors, or whether multiple model input sizes are supported.

Example 14 includes the subject matter of any of examples 1-13, including or omitting optional elements, wherein the baseband processor is configured to, when the number of PRBs indicated by the CSI report configuration is X PRBs less than the number of inputs to the AI encoder used for CSI feedback compression assign each PRBs indicated by the CSI report configuration to a different subband; and generate X padding eigen-vectors or repetition eigen-vectors.

Example 15 includes the subject matter of any of examples 1-14, including or omitting optional elements, wherein the baseband processor is configured to generate a channel quality indicator (CQI) report based on a configured integer multiple of the determined respective numbers of PRBs in each respective subband, wherein the integer is greater than or equal to one.

Example 16 includes the subject matter of any of examples 1-15, including or omitting optional elements, wherein the baseband processor is configured to generate a channel quality indicator (CQI) report based on subbands configured according to a legacy configuration.

Example 17 is an apparatus for a user equipment (UE), including the baseband processor and memory of any of examples 1-16.

Example 18 is a method for a base station, including transmitting a channel state information (CSI) report configuration that indicates a number of PRBs; receiving, from a user equipment (UE), a set of AI-based CSI feedback compression encoder outputs corresponding to compressed CSI feedback; decoding the received set of AI-based CSI feedback compression encoder outputs to generate a set of M estimated input eigen-vectors summarizing a channel state matrix, wherein M is a number of inputs to the AI-based CSI feedback compression encoder, wherein the decoding is based on a number of subbands and a respective number of PRBs in each respective subband; and transmitting physical downlink control channel or physical downlink shared channel (PDCCH/PDSCH) based on channel state information encoded by a set of eigen-vectors that includes at least one of the M estimated input eigen-vectors.

Example 19 includes the subject matter of example 18, including or omitting optional elements, further including transmitting a configuration of the number of PRBs in each subband; and determining the number of subbands based on the configured number of PRBs and the number of PRBs indicated by the CSI report configuration.

Example 20 includes the subject matter of any of examples 18-19, including or omitting optional elements, wherein a number of PRBs in each respective subband is the same.

Example 21 includes the subject matter of any of examples 18-20, including or omitting optional elements, further including removing padding eigen-vectors from the M estimated input eigen-vectors to generate the set of eigen-vectors.

Example 22 includes the subject matter of any of examples 18-21, including or omitting optional elements, further including adapting the M estimated input eigen-vectors to generate a reduced number of eigen-vectors for the set of eigen-vectors.

Example 23 includes the subject matter of any of examples 18-22, including or omitting optional elements, further including transmitting a configuration to the UE that indicates whether padding eigen-vectors or adaptation of subband eigen-vectors are used for AI-based encoder input alignment.

Example 24 includes the subject matter of any of examples 18-23, including or omitting optional elements, further including receiving a UE capability report indicating a maximum number of eigen-vectors, whether multiple model input sizes are supported, or whether the UE supports generation of padding eigen-vectors or adaptation of subband eigen-vectors.

Example 25 includes the subject matter of any of examples 18-24, including or omitting optional elements, further including transmitting a configuration indicating fixed or variable subband size to the UE.

Example 26 includes the subject matter of any of examples 18-25, including or omitting optional elements, further including receiving successive compressed CSI feedback associated with different respective portions of a same channel; decoding each successive compressed CSI feedback to generate successive sets of eigen-vectors; and including the successive sets of eigen-vectors in the set.

Example 27 is a method for a user equipment including performing operations performed by the baseband processor of any of examples 1-16.

Example 28 is an apparatus for a base station including a memory and one or more processors configured to, when executing instructions stored in the memory, cause the base station to perform the method steps of any of examples 18-26.

The above description of illustrated examples, implementations, aspects, etc., of the subject disclosure, including what is described in the Abstract, is not intended to be exhaustive or to limit the disclosed aspects to the precise forms disclosed. While specific examples, implementations, aspects, etc., are described herein for illustrative purposes, various modifications are possible that are considered within the scope of such examples, implementations, aspects, etc., as those skilled in the relevant art can recognize.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases. In some embodiments, the methods illustrated above may be implemented in a computer readable medium using instructions stored in a memory. Many other embodiments and variations are possible within the scope of the claimed disclosure.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A user equipment (UE), comprising:

a memory; and a baseband processor coupled to the memory, the baseband processor configured to, when executing instructions stored in the memory, cause the UE to:

receive a channel state information (CSI) report configuration that indicates a number of PRBs;

determine a number of subbands based on a number of inputs to an artificial intelligence (AI) encoder used for CSI feedback compression;

determine a number of PRBs for each of the subbands such that all PRBs indicated by the CSI report configuration are assigned to a subband and no subband includes a PRB outside the PRBs indicated by the CSI report configuration; and based on the determined number of subbands, generate one or more sets of eigen-vectors, wherein each set includes a number of eigen-vectors equal to the number of inputs to the AI-based encoder, further wherein one or more of the eigen-vectors summarizes a channel state matrix across a respective subband;

input the one or more sets of eigen-vectors to the AI-based encoder; and transmit a CSI report based on an output of the AI-based encoder.

2. The UE of claim 1, wherein the baseband processor is configured to cause transmission of a UE capability report indicating a maximum number of eigen-vectors, whether multiple model input sizes are supported, support of a variable subband size, or whether the UE supports generation of padding eigen-vectors or adaptation of subband eigen-vectors for use in generating the one or more sets of eigen-vectors when the number of subbands is less than the number of inputs of the AI-based encoder.

3. The UE of claim 1, wherein the baseband processor is configured to when the quotient of the number of PRBs indicated by the CSI report configuration and the number of subbands is a whole number, determine a number of PRBs for all respective subbands as the quotient; and when the quotient is not a whole number, determine a first number of PRBs for a first set of respective subbands as a next higher whole number with respect to the quotient and a second number of PRBs for a second set of respective subbands as one less PRB than the first number of PRBs.

4. The UE of claim 1, wherein the baseband processor is configured to, when the number of PRBs indicated by the CSI report configuration is X PRBs less than the number of inputs to the AI-based encoder, assign each PRB indicated by the CSI report configuration to a different subband; and generate X padding eigen-vectors or repetition eigen-vectors.

5. The UE of claim 1, wherein the baseband processor is configured to generate a channel quality indicator (CQI) report based on a configured integer multiple of the determined respective numbers of PRBs in each respective subband, wherein the integer is greater than or equal to one or based on subbands configured according to a legacy configuration.

6. A baseband processor, configured to:

receive a channel state information (CSI) report configuration that indicates a number of PRBs;

receive a configuration of the number of PRBs in each subband;

determine a number of subbands based on the configured number of PRBs in each subband and the number of PRBs indicated by the CSI report configuration; and generate one or more eigen-vectors for each sub-band, wherein one or more of the eigen-vectors summarize a channel state matrix across a respective subband, further wherein the number of eigen-vectors corresponds to an integer multiple of the number of inputs of an artificial intelligence (AI)-based encoder used for CSI feedback compression.

7. The baseband processor of claim 6, configured to, when the number of subbands is less than the number of inputs of the AI-based encoder, generate padding eigen-vectors for input to the AI-based encoder.

8. The baseband processor of claim 6, configured to, when the number of subbands is less than the number of inputs of the AI-based encoder, generate the one or more eigen-vectors by adapting the eigen-vectors generated for the subbands.

9. The baseband processor of claim 6, configured to receive a configuration indicating either padding eigen-vectors or adaptation of subband eigen-vectors for use in generating the one or more eigen-vectors when the number of subbands is less than the number of inputs of the AI-based encoder.

10. A method for a base station, comprising:

transmitting a channel state information (CSI) report configuration that indicates a number of PRBs;

transmitting a configuration of the number of PRBs in each subband;

receiving, from a user equipment (UE), a set of AI-based CSI feedback compression encoder outputs corresponding to compressed CSI feedback;

determining a number of subbands based on the configured number of PRBs and the number of PRBs indicated by the CSI report configuration;

based on the number of subbands, decoding the received set of AI-based CSI feedback compression encoder outputs to generate a set of M estimated input eigen-vectors summarizing a channel state matrix, wherein M is a number of inputs to an AI-based CSI feedback compression encoder; and transmitting physical downlink control channel or physical downlink shared channel (PDCCH/PDSCH) based on the M estimated input eigen-vectors.

11. The method of claim 10, further comprising removing padding eigen-vectors from the M estimated input eigen-vectors to generate the set of eigen-vectors.

12. The method of claim 10, further comprising adapting the M estimated input eigen-vectors to generate a reduced number of eigen-vectors for the set of eigen-vectors.

13. The method of claim 10, further comprising transmitting a configuration to the UE that indicates whether padding eigen-vectors or adaptation of subband eigen-vectors are used for AI-based encoder input alignment.

14. The method of claim 13, further comprising receiving a UE capability report indicating a maximum number of eigen-vectors, whether multiple model input sizes are supported, or whether the UE supports generation of padding eigen-vectors or adaptation of subband eigen-vectors.

15. The method of claim 10, further comprising transmitting a configuration indicating fixed or variable subband size to the UE.

16. The method of claim 10, further comprising receiving successive compressed CSI feedback associated with different respective portions of a same channel;

decoding each successive compressed CSI feedback to generate successive sets of eigen-vectors; and including the successive sets of eigen-vectors in the set.

* * * * *